E. M. ERB.
GREASE CUP.
APPLICATION FILED APR. 14, 1915.

1,170,435.

Patented Feb. 1, 1916.

WITNESSES
George L. Blume
B. Joffe

INVENTOR
Edmund M. Erb
BY
ATTORNEYS

THE COLUMBIA PLANOGRAPH CO., WASHINGTON, D. C.

UNITED STATES PATENT OFFICE.

EDMUND M. ERB, OF JERSEY CITY, NEW JERSEY.

GREASE-CUP.

1,170,435.

Specification of Letters Patent.

Patented Feb. 1, 1916.

Application filed April 14, 1915. Serial No. 21,249.

*To all whom it may concern:*

Be it known that I, EDMUND M. ERB, a citizen of the United States, and a resident of Jersey City, in the county of Hudson and State of New Jersey, have invented a new and Improved Grease-Cup, of which the following is a full, clear, and exact description.

This invention relates to grease cups and has reference more particularly to a cup retainer intended to prevent the loss of the cup proper by the vibration of the machinery to which the grease cup is attached and which may cause the cup to move on its plunger.

An object of the invention is to provide a simple, efficient and inexpensive contrivance which can be easily and quickly attached to a grease cup in existence or to one to be manufactured.

With the above and other objects in view, the nature of which will more fully appear as the description proceeds, the invention consists in the novel construction, combination and arrangement of parts as herein fully described, illustrated and claimed.

In the accompanying drawings forming part of the application, similar characters of reference indicate corresponding parts in all the views.

Figure 1:
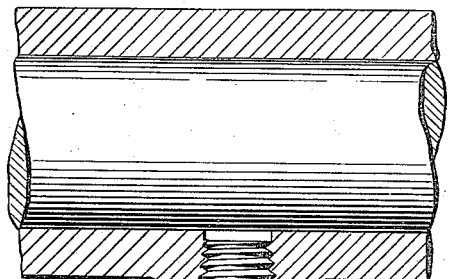
Figure 3:
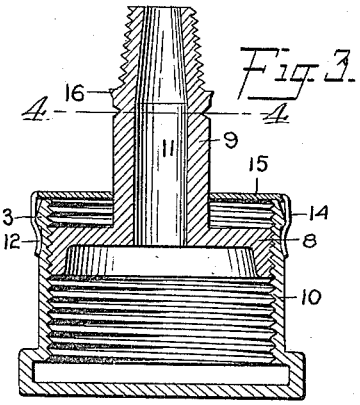
Figure 2:
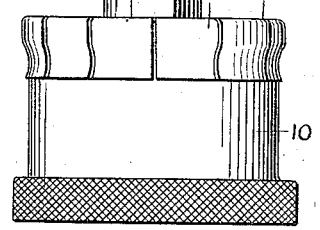
Figure 4:
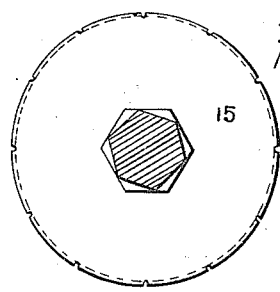
Figure 5:
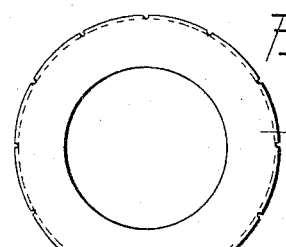
Figure 6:
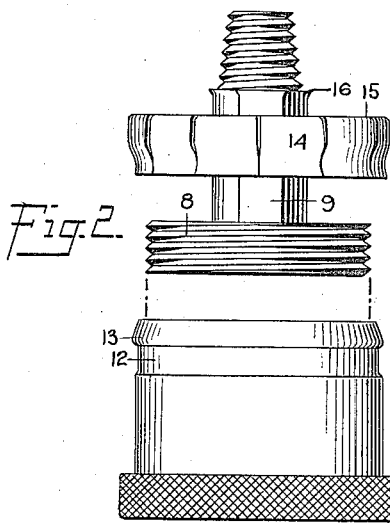
Figure 6:
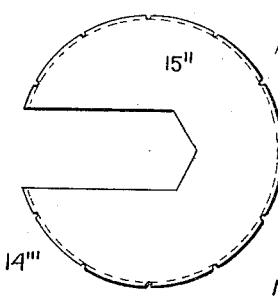
Figure 7:
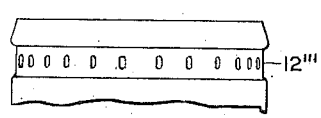

Figure 1 is a side elevation of a grease cup provided with an embodiment of my invention and shown attached to a vehicle axle; Fig. 2 is an elevation of the grease cup, the parts of which are separate; Fig. 3 is a vertical sectional view through the grease cup; Fig. 4 is a section on line 4—4, Fig. 3; Fig. 5 is a similar view of a modified structure of the cap; Fig. 6 is a further modified structure of the cap; Fig. 7 is a further modification of the cap structure and the portion of the cup engageable by the cap.

Referring to the drawings, 8 represents a plunger, the stem 9 of which is provided with a threaded end whereby the same can be secured to the part which is to be supplied with the grease. The plunger is threaded exteriorly to accommodate the cup 10 of the customary structure which, when threaded on the plunger, will force the grease from within the cup out through the bore 11 of the plunger, the plunger and cup being of the customary design.

The cup 10 on the exterior surface thereof adjacent the open end is provided with an annular recess 12. The shoulder 13 resulting from the formation of the recess tapers toward the open end of the cup so as to facilitate the engagement of the cap by the resilient skirt 14 of the cap 15 which is mounted on the stem of the plunger. The skirt 14 is formed of sections so as to increase its resiliency and the lower portion of said skirt is bent inwardly so as to fit tightly into the recess 12 of the cup. The stem 9 of the plunger is the customary angular one in cross section, so that the same may be easily grasped by a wrench when the plunger is to be attached.

The cap 15 has an angular opening 16 which corresponds to the angularity of the stem, whereby said cap is free to slide on the stem 9 but is prevented from turning thereon. This provision tends to increase the resistance of the unscrewing of the cup from the plunger through the vibration to which the body carrying the grease cup is subjected. It is self-evident that when the cup 10 is removed from the plunger the cap 15 will be retained on the plunger by the body thereof, which will help to disengage the cap from the cup. After the cap 15 is fitted on the stem 9 of the plunger the edges of the shank at the threads are forced outwardly as indicated at 16, so as to prevent the cap from falling off the stem in handling the grease cup. The stem 9 is also provided with grooves 18 tapered from left to right and adapted to engage the edges of the hole in the cap when the cup is unscrewed after it has been totally screwed on to the plunger. This engagement of the cap with the stem will separate the cap from the cup at the outset of the unscrewing movement. The advantage of this construction is that no dirt or grit can be snapped on to the threads of the shank, which might occur when the cap is tripped by the plunger. Another advantage is that the cap does not impede the very free unscrewing of the cup, as it is stripped from it at the beginning of the unscrewing motion, as stated, but the head of the shank or the plunger still retains its function of stripping the cap from the cup when the cup is removed before being screwed totally on to the plunger.

In Fig. 5 a modified structure of the cap 15 is shown, in which case the central opening is not angular but circular, so that the cap 15' is free to rotate with the cup 10 while the same is screwed on or off the plunger before the cap comes into engagement with the body of the plunger.

In Fig. 6 a further modification of the cap is shown. In this structure the cap 15″ has a slot extending from one edge thereof to the center so that the cap 15″ can be placed on to a grease cup, the plunger of which is secured. After the engagement of the cap with the stem of the plunger the same can be forced into engagement with the cup by simply pressing the cap against the cup.

In Fig. 7 the skirt of the cap 15‴ is provided with a series of inwardly directed protuberances 17 which will tend to increase friction between the skirt of the cup and the groove 12‴ of the cup. In addition to that, the groove 12‴ can be provided with recesses to accommodate the protuberances 17 and thereby form a ratchet effect between the cap and the cup, thus greatly increasing the friction therebetween. If desired the bead may be provided with grooves.

Having thus described my invention, I claim:—

1. A grease cup comprising a plunger having a stem, a cup threaded on to the plunger, a cap on the stem of the plunger mounted to slide but prevented from rotation thereon, said cap having a depending resilient skirt adapted to frictionally engage the exterior open end of the cup, said skirt having protuberances and said cup having recesses adapted to be engaged by said protuberances when said cap is in engagement with the cup, said cap adapted to participate in the axial displacement of the cup when the same is moved on the plunger, said plunger adapted to engage the cap when said cup is removed from the plunger, whereby the cap disengages the cup.

2. A grease cup comprising a plunger having a stem, a cup threaded on to the plunger, a cap on the stem of the plunger mounted to slide but prevented from rotation thereon, said cap having means for frictionally engaging said cup, said stem having means for engaging the cap when the cup is to be unscrewed from the plunger after it has been totally screwed thereon, whereby the cap may be stripped from the cup before the cup is totally unscrewed from the plunger.

3. A grease cup comprising a plunger having a stem, a cup threaded on to the plunger, a cap on the stem of the plunger mounted to slide but prevented from rotation thereon, said cap having means for frictionally engaging said cup, said stem having tapering grooves adapted to engage and retain the cap when the cup is unscrewed after the same has been totally screwed on to the plunger, thereby stripping the cap from the cup at the beginning of the unscrewing movement.

4. A grease cup comprising a plunger having a stem, a cup threaded on to the plunger, a cap on the stem of the plunger mounted to slide but prevented from rotation thereon, said cap having a depending, resilient skirt for frictionally engaging the open end of the cup, said cup having means at the open end engageable by the skirt, whereby the skirt grips yieldingly the cup.

5. A grease cup comprising a plunger having a stem, a cup threaded on to the plunger, and a cap on the stem of the plunger mounted to slide but prevented from rotation thereon, said cap having a depending, resilient skirt, said cup having an annular groove at the open end adapted to be engaged by the resilient skirt of the cap whereby said skirt grips yieldingly said cup.

6. A grease cup comprising a plunger, a cup threaded on the plunger, and a cap having a depending, resilient skirt for yieldingly gripping the cup at the open end of the cup, said skirt adapted to yield and release the cup when said cup is removed from said plunger.

7. A grease cup comprising a plunger having a stem, a cup threaded on to the plunger, a cap on the stem of the plunger mounted to slide but prevented from rotation thereon, said cap having a depending, resilient skirt for yieldingly gripping the cup at the open end thereof, said stem having means for engaging the cap when the cup is to be unscrewed from the plunger after it has been totally screwed thereon whereby the cap will release the cup before the cup is totally unscrewed from the plunger.

In testimony whereof I have signed my name to this specification in the presence of two subscribing witnesses.

EDMUND M. ERB.

Witnesses:
  B. JOFFE,
  G. H. EMSLIE.